United States Patent
Lyu et al.

(10) Patent No.: US 8,822,902 B2
(45) Date of Patent: Sep. 2, 2014

(54) OPTICAL APPARATUS HAVING ADJUSTABLE PINHOLE BY ADJUSTING THE TRANSPARENCE OF A LIQUID CRYSTAL SWITCH AND METHOD USING THE SAME

(75) Inventors: Hong-Chou Lyu, Changhua (TW); Yuan-Chin Lee, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 289 days.

(21) Appl. No.: 13/474,354

(22) Filed: May 17, 2012

(65) Prior Publication Data

US 2013/0153758 A1    Jun. 20, 2013

(30) Foreign Application Priority Data

Dec. 14, 2011 (TW) .............................. 100146338 A

(51) Int. Cl.
    *H01J 3/14* (2006.01)
(52) U.S. Cl.
    USPC .......................................... 250/216; 250/205
(58) Field of Classification Search
    USPC .......... 250/216, 205, 226, 221, 229; 359/453; 349/11–199, 726
    See application file for complete search history.

(56) References Cited

U.S. PATENT DOCUMENTS 6,800,856 B2 * 10/2004 Bruns ........................... 250/351
7,369,481 B2   5/2008 Kimura et al.
7,450,187 B2  11/2008 Sun
2006/0012872 A1  1/2006 Hayashi et al.
2006/0209399 A1  9/2006 Mikuriya et al.

FOREIGN PATENT DOCUMENTS

| JP | 6109958 | 4/1994 |
| JP | 6109959 | 4/1994 |
| TW | 227050 | 7/1994 |
| TW | 502108 | 9/2002 |
| TW | 555954 | 10/2003 |
| TW | 201108224 A1 | 3/2011 |

OTHER PUBLICATIONS

TW Office Action dated Mar. 6, 2014.
English language translation of abstract of JP 6109958 (published Apr. 22, 1994).
English language translation of abstract of JP 6109959 (published Apr. 22, 1994).

(Continued)

*Primary Examiner* — Que T Le
(74) *Attorney, Agent, or Firm* — McClure, Qualey & Rodack, LLP

(57) ABSTRACT

An optical apparatus for adjusting the position and aperture of a pinhole and a method using the same are provided. A light beam is provided. The light beam is focused on an object and reacts with the object to form a signal beam. The signal beam is focused and projected on a liquid-crystal switch. The projection position of the signal beam on the liquid-crystal switch is determined, and the transparence of the liquid-crystal switch at the projection position is adjusted to form a transparent area. The signal beam passes through the transparent area and reaches a light detecting unit to form a detecting signal. The aperture of the transparent area is adjusted according to the intensity of the detecting signal. The liquid-crystal switch is driven to move, so that the position of the transparent area in the moving direction of the signal beam is adjusted.

10 Claims, 3 Drawing Sheets

(56) References Cited

OTHER PUBLICATIONS

English language translation of abstract of TW 227050 (published Jul. 21, 1994).
English language translation of abstract of TW 502108 (published Sep. 11, 2002).
English language translation of abstract of TW 555954 (published Oct. 1, 2003).
Wilson, T., et al.; "Size of the Detector in Confocal Imaging Systems;" Optics Letters; vol. 12; No. 4; Apr. 1987; pp. 227-229.
Kimura, S., et al.; "Dependence of 3-D Optical Transfer Functions on the Pinhole Radius in a Fluorescent Confocal Optical Microscope;" Applied Optics; vol. 29; No. 20; Jul. 1990; pp. 3007-3011.
Ghiggino, K.P., et al.; "Fluorescent Lifetime Measurements using a Novel Fiber-Optic Laser Scanning Confocal Microscope;" American Institute of Physics; May 1992; pp. 2999-3003.
Gmitro, A.F., et al.; "Confocal Microscopy through a Fiber-Optic Imaging Bundle;" Optics Letters; vol. 18; No. 8; Apr. 1993; pp. 565-567.

* cited by examiner

OPTICAL APPARATUS HAVING ADJUSTABLE PINHOLE BY ADJUSTING THE TRANSPARENCE OF A LIQUID CRYSTAL SWITCH AND METHOD USING THE SAME

CROSS-REFERENCE TO RELATED APPLICATION

This application claims the priority benefit of Taiwan application Serial No. 100146338, filed Dec. 14, 2011, the disclosure of which is incorporated by reference herein in its entirety.

TECHNICAL FIELD

The technical field relates in general to an optical system, and in particular to an optical apparatus having an adjustable pinhole and a method using the same.

BACKGROUND

The pinhole is disposed at the outgoing-light focusing position of the object end in a conjugate focus optical system. The outgoing-light focusing position optically corresponds to the position of the conjugate focus in a light-collecting optical system. The pinhole filters off the light echo not coming from the focus of the object end to reduce the noise of light echo in the optical system and obtain an image more delicate than that obtained with an optical system without pinhole. Since the position of the pinhole is fixed, the calibration of the focusing position of the signal beam on the plane of the pinhole is normally achieved by adjusting the focusing lens of the light-collecting optical system. That is, the position of the focusing lens on the plane of the pinhole can only be adjusted in the X-Y directions but not in the Z direction. The X-Y directions are perpendicular to each other, and the Z-direction is perpendicular to the pinhole plane. The Z-direction calibration cannot be achieved because the distance between the pinhole and the detection element is fixed.

SUMMARY

According to one embodiment, a method for adjusting the position and aperture of a pinhole is provided. The method includes the following steps. A light beam is provided. The light beam is focused on an object and reacts with the object to form a signal beam. The signal beam is focused and projected on a liquid-crystal switch. The projection position of the signal beam on the liquid-crystal switch is determined, and the transparence of the liquid-crystal switch at the projection position is adjusted to form a transparent area, such that the signal beam may pass through the transparent area and reach a light detecting unit to form a detecting signal. The size of the transparent area is adjusted according to the detecting signal. The liquid-crystal switch is driven to move in a moving direction of the signal beam, so that the position of the transparent area in the moving direction of the signal beam can be adjusted.

According to another embodiment, an optical apparatus for adjusting the position and aperture of a pinhole is provided. The apparatus includes a light source, an imaging unit, a liquid-crystal switch, a processing unit, a light detecting unit and an actuator. The light source is for generating a light beam. The imaging unit is for focusing the light beam on an object. The light beam reaches the object to form a signal beam. The liquid-crystal switch is located in a moving direction of the signal beam for the signal beam to be projected on the liquid-crystal switch. The processing unit is for determining the projection position of the signal beam on the liquid-crystal switch, and the transparence of the liquid-crystal switch at the projection position is adjusted to form a transparent area. The light detecting unit is for receiving the signal beam passing through the transparent area to form a detecting signal. The processing unit coupled to the light detecting unit adjusts the aperture of the transparent area according to the detecting signal. The actuator coupled to the liquid-crystal switch drives the liquid-crystal switch to move, so that the position of the transparent area in the moving direction of the signal beam can be adjusted.

DETAILED DESCRIPTION OF DISCLOSED EMBODIMENTS

A number of embodiments are disclosed below for elaborating the disclosure. However, the embodiments of the disclosure are for detailed descriptions only, not for limiting the scope of protection of the invention.

An optical apparatus having an adjustable pinhole and the method using the same disclosed in the following embodiments, the optical apparatus comprises a liquid-crystal switch, and a transparent area of the liquid-crystal switch is used as an adjustable pinhole. The liquid-crystal switch comprises a plurality of liquid crystal molecules and the transparence of the transparent area of the liquid-crystal switch is adjusted by adjusting a bias voltage to the liquid-crystal switch. Also, the aperture of the pinhole (i.e. the transparent area of the liquid-crystal switch) can be adjusted by making the liquid crystal molecules concurrently become permeable to the light in several pixel areas so as to filter off the stray light not coming from the focus plane of the focusing lens. In addition, when the light source is replaced with a different one, the wavelength of the signal beam will change accordingly, the focusing position of the signal beam will be slightly shifted, and so will the conjugate focusing position of light echo be shifted. Meanwhile, through the movement of the liquid-crystal switch along the optical axis direction, the position of the transparent area of the liquid-crystal switch can reach to the conjugate focusing position to increase the precision of optical measurement.

Figure 1:
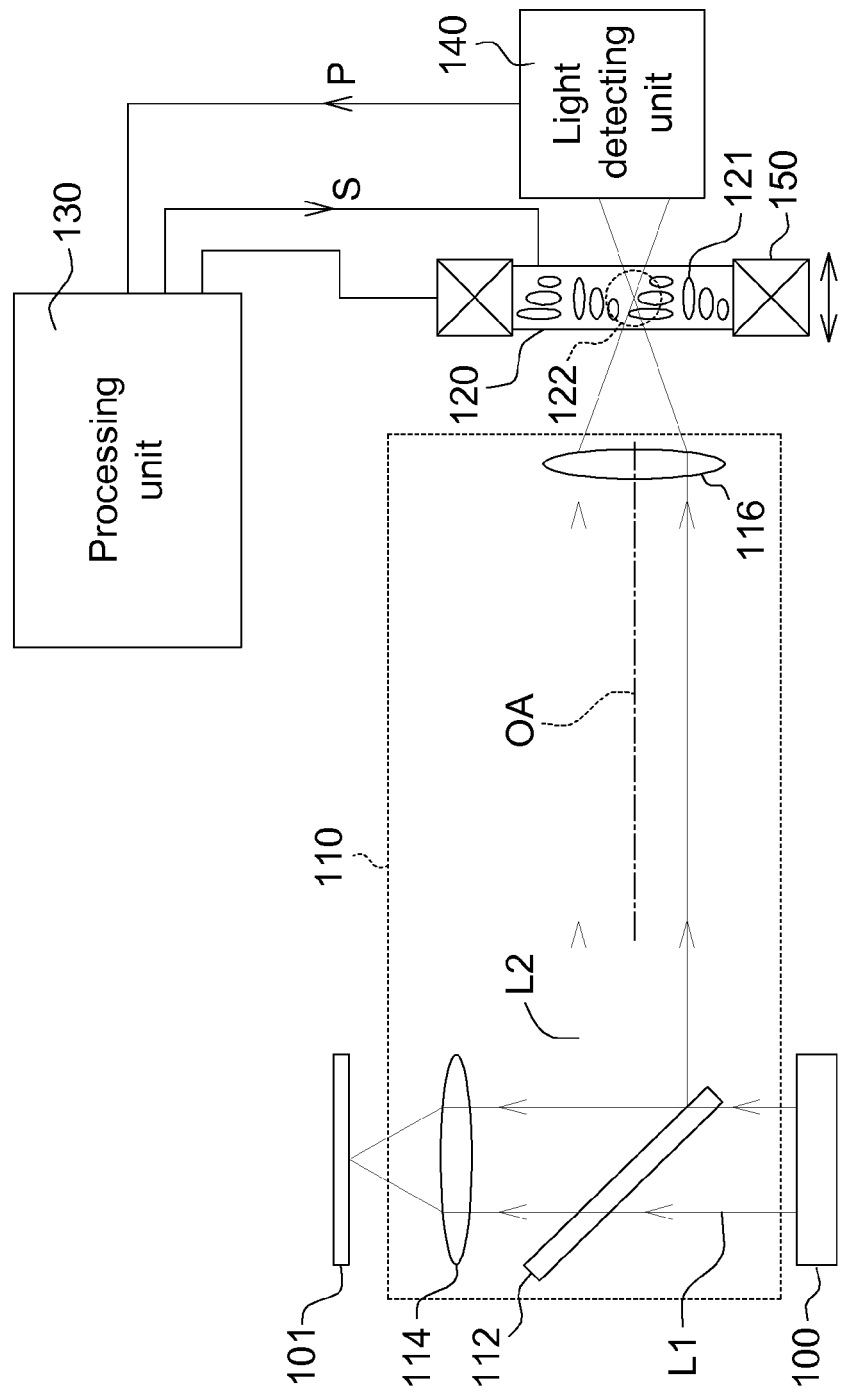
FIG. 1 shows a schematic diagram of an optical apparatus for adjusting the position and aperture of a pinhole according to one embodiment.
Figure 2:
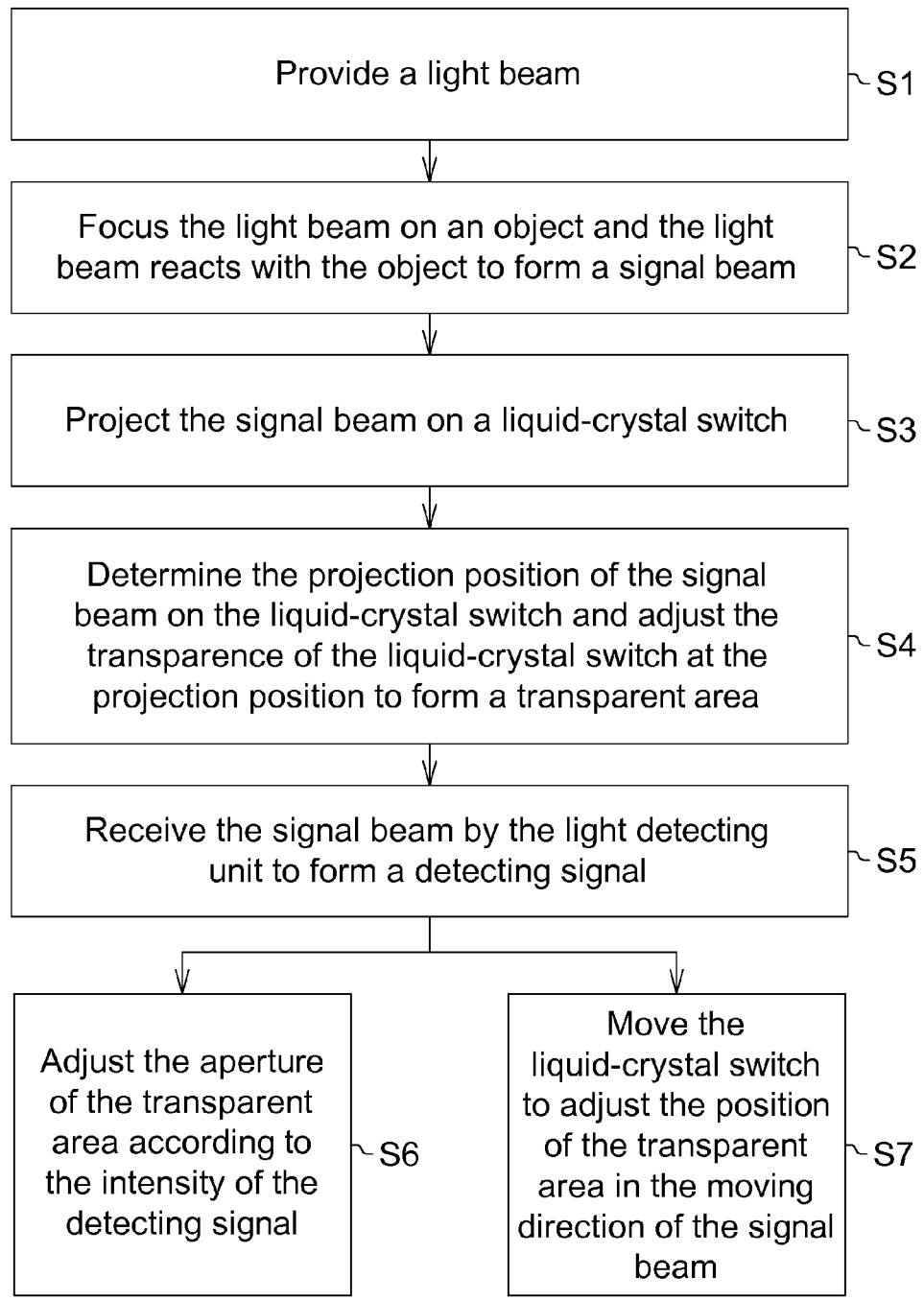
FIG. 2 shows a flowchart of a method for adjusting the position and aperture of a pinhole according to one embodiment.

Referring to FIGS. 1 and 2. FIG. 1 shows a schematic diagram of an optical apparatus having an adjustable pinhole according to one embodiment. FIG. 2 shows a flowchart of a method for adjusting a pinhole of an optical apparatus according to one embodiment.

As shown in FIG. 1, the optical apparatus 10 includes a light source 100, an imaging unit 110, a liquid-crystal switch 120, a processing unit 130, a light detecting unit 140 and an actuator 150. Details of each of steps S1~S7 of FIG. 2 are disclosed below with the exemplification of the optical apparatus 10 of FIG. 1.

In step S1, a light beam L1 is generated by the light source 100. The light beam L1 is such as a collimated laser beam or other coherent beams.

In step S2, the light beam L1 is focused on an object 101 by the imaging unit 110, and the light beam L1 reacts with the object 101 to produce a signal beam L2 after reaching the object 101. The signal beam L2 has several implementations to serve various purposes of observation. For example, the signal beam L2 may be a reflective light from the object 101, a fluorescent light generated when the object 101 is excited by an incoming light, a signal beam generated from a second, a third or an even higher harmonic generation due to non-linear effect, or a signal beam generated due to Raman effect. As shown in FIG. 1, the imaging unit 110 may include a beam divider 112, a first focusing element 114 and a second focusing element 116. The first focusing element 114 is such as a lens for focusing the light beam L1 passing through the beam divider 112 and enabling the focused light beam L1 to reach the object 101. The second focusing element 116 is such as a lens for focusing the signal beam L2 passing through the first focusing element 114 and the beam divider 112 for enabling the signal beam L2 to be focused on the focus of the second focusing element 116.

In step S3, the signal beam L2 is projected on the liquid-crystal switch 120 through the second focusing element 116. Referring to the embodiment shown in FIG. 1, a transparent area 122 of the liquid-crystal switch 120 is used as a pinhole, and the position of the pinhole is the projection position of the signal beam L2 on the liquid-crystal switch 120. When the liquid-crystal switch 120 is driven OFF, the liquid-crystal switch 120 becomes impermeable to the light due to the polarization of the liquid crystal molecules 121 of the liquid-crystal switch 120, and the signal beam L2 is unable to pass through the liquid-crystal switch 120. When the liquid-crystal switch 120 receives a bias voltage, the arrangement of the liquid crystal molecules 121 of the liquid-crystal switch 120 changes as the volume of the bias voltage is adjusted. As the arrangement of the liquid crystal molecules 121 of the liquid-crystal switch 120 changes, the transparence of the liquid-crystal switch 120 changes accordingly, and a transparent area 122 is formed. When the transparent area 122 is located at the focus of the second focusing element 116, the stray light not coming from the focus plane may further be filtered off by adjusting the aperture size of the transparent area 122 to increase the signal noise ratio and the contrast.

In step S4, the processing unit 130 determines the projection position of the signal beam L2 on the liquid-crystal switch 120, and adjusts the transparence of the liquid-crystal switch 120 at the projection position to form a transparent area 122. In one embodiment, the processing unit 130 emits a scanning signal S to the liquid-crystal switch 120, and activates the pixels (not illustrated) of the liquid-crystal switch 120 sequentially with the scanning signal S. When the pixels (the liquid crystal molecules) corresponding to the projection position of the signal beam L2 are activated, the signal beam L2 passes through the liquid-crystal switch 120 and reaches the light detecting unit 140 to form a detecting signal P. The detecting signal P may be transmitted to the processing unit 130 by the light detecting unit 140. Thus, the processing unit 130 may determinate the projection position of the signal beam L2 on the liquid-crystal switch 120 through monitoring the changes of the detecting signal P as the pixels of the liquid-crystal switch 120 is sequentially activated.

In step S5, the signal beam L2 passing through the transparent area 122 is received by the light detecting unit 140 to form a detecting signal P. The light detecting unit 140 is such as a photomultiplier tube, an avalanche photodiode (APD), or a P-intrinsic-N diode (PIN diode). The detecting signal P is outputted to the processing unit 130. The detection intensity of the detecting signal P is determined by the processing unit 130.

In step S6, the aperture of the transparent area 122 (that is, the aperture of the pinhole) is adjusted by the processing unit 130 according to the intensity of the detecting signal. As the aperture of the pinhole becomes smaller, the volume of the stray light passing through the pinhole diminishes. Thus, the light filtering effect becomes more significant. Since the aperture of the transparent area 122 may be adjusted through the feedback of the detecting signal P, the optical apparatus 10 can have the functions of real-time control and fine tuning.

In step S7, the actuator 150 is coupled to the liquid-crystal switch 120 and drives the liquid-crystal switch 120 to move for adjusting the position of the transparent area 122 on the moving direction (the optical axis direction OA) of the signal beam L2. Therefore, through the movement in the optical axis direction, the liquid-crystal switch 120 is able to make the position of the transparent area 122 located at the conjugate focus. Referring to the embodiment shown in FIG. 1, since the position (one dimension in Z-direction) of the liquid-crystal switch 120 in the axial direction is adjustable and the processing unit 130 may determine the position (two dimensions in X-Y directions) of the transparent area 122 and adjust the aperture of the transparent area 122, the time for adjusting the 3D position and aperture of the pinhole is shortened and the conjugate focus effect becomes more significant.

Figure 3:
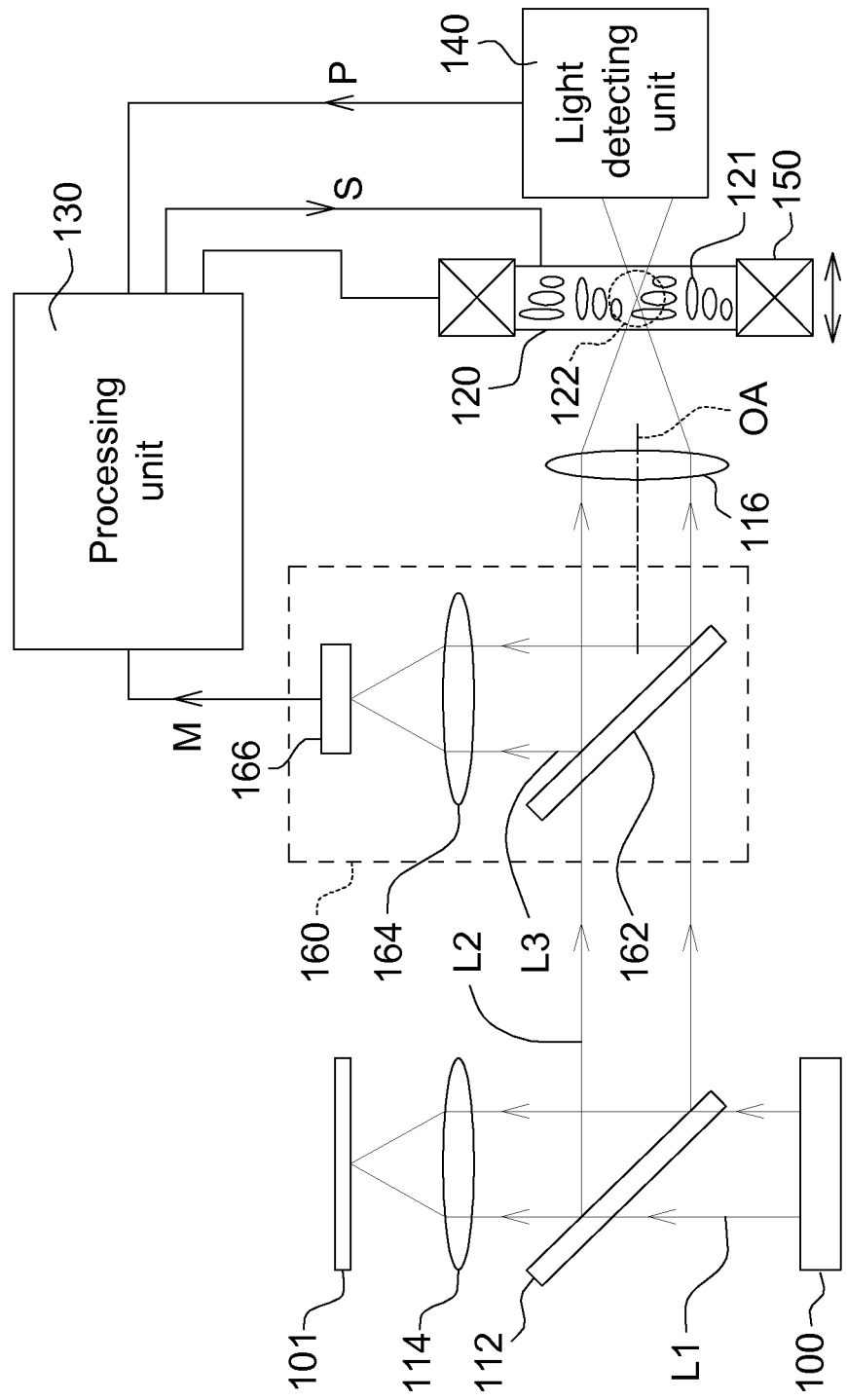
FIG. 3 shows a schematic diagram of an optical apparatus for adjusting the position and aperture of a pinhole according to one embodiment.

Referring to FIG. 3, a schematic diagram of an optical apparatus having an adjustable pinhole according to one embodiment is shown. The optical apparatus 11 further includes an image capturing unit 160 coupled to the processing unit 130. The image capturing unit 160 is for capturing a part of the reflective beam L3 to acquire an optical image M. The image capturing unit 160 includes a beam divider 162, a focusing element 164 and an image sensor 166. The beam divider 162 is for receiving a reflective beam L3 formed from the signal beam L2 projected on the liquid-crystal switch 120 through the second focusing element 116 and then reflected by the liquid-crystal switch 120. The reflective beam L3, after passing through the beam divider 162, is reflected to reach the focusing element 164. The reflective beam L3 is projected on the image sensor 166 through the focusing element 164 to form an optical image signal M. The optical image signal M is transmitted to the processing unit 130 for the purpose of image recognition. Referring to the embodiment shown in FIG. 3, the position and direction of the image sensor 166 with respect to the liquid-crystal switch 120 may be adjusted, so that the pixels of the image sensor 166 may correspond to that of the liquid-crystal switch 120. Thus, the processing unit 130 may determine the projection position of the signal beam L2 according to the optical image signal M. Since the image sensor 166 may observe the projection position of the signal beam L2 on the liquid-crystal switch 120, the processing unit 130 may emit a scanning signal S to the liquid-crystal switch 120 and activate the pixels (not illustrated) of the liquid-crystal switch 120 sequentially with the scanning signal S. When the pixels corresponding to the projection position of the signal beam L2 are activated directly, the signal beam L2 may directly pass through the liquid-crystal switch 120 and reach the light detecting unit 140 to form a detecting signal P. In some embodiments, when the signal beam L2 is a third harmonic generation beam, the intensity of the signal beam L2 is weaker because the beam divider 162 weakens the intensity of the signal lastly passing through the liquid-crystal switch 120. The beam divider 162 can be a movable beam divider, and after the position of the transparent area of the liquid-crystal switch 120 is located, the beam divider 162 is moved off the optical axis to avoid blocking the signal beam L2. The beam divider may be moved manually. Alternately, a mobile device can be coupled to the beam divider 162 for moving the beam divider 162.

The light detecting unit 140 is for receiving the signal beam L2 passing through the transparent area 122 to form a detecting signal P. The processing unit 130 may adjust the aperture of the transparent area 122 (that is, the aperture of the pinhole) according to the intensity of the detecting signal P. Since the aperture of the transparent area 122 may be adjusted through the feedback of the detecting signal P, the optical apparatus 11 can have the functions of real-time control and fine-tuning.

If the spectrum of the light beam includes multi-wavelengths, even when the second focusing element 116 uses the achromatic focusing lens, the forward-backward position of the focus of the signal beam L2 will be slightly different for different wavelengths. Therefore, for the light beam having different wavelengths, it is necessary to adjust the forward-backward position of the pinhole. As shown in FIG. 3, the actuator 150 is coupled to the liquid-crystal switch 120 and drives the liquid-crystal switch 120 to move, so that the position of the transparent area 122 in the moving direction (the optical axis direction OA) of the signal beam L2 may be adjusted. Thus, through the movement of the liquid-crystal switch 120 along the optical axis direction, the transparent area 122 of the liquid-crystal switch 120 can reach to the conjugate focus. In the present embodiment, the axial position of the liquid-crystal switch 120 (that is, the position of the liquid-crystal switch 120 in the moving direction of the signal beam L2) can be adjusted. Furthermore, in the embodiment, the processing unit 130, in a real-time manner, may determine the position of the transparent area 122 through the image capturing unit 160 and adjust the aperture of the transparent area 122. Therefore, the time for adjusting the 3D position and aperture of the pinhole is shortened and the conjugate focus effect becomes more significant.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for adjusting the position and aperture of a pinhole, comprising:
   providing a light beam;
   focusing the light beam on an object and reacting with the object to form a signal beam;
   focusing and projecting the signal beam on a liquid-crystal switch;
   determining the projection position of the signal beam on the liquid-crystal switch and adjusting the transparence of the liquid-crystal switch at the projection position to form a transparent area;
   enabling the signal beam to pass through the transparent area and reach a light detecting unit to form a detecting signal;
   adjusting the aperture of the transparent area according to the detecting signal; and
   moving the liquid-crystal switch to adjust the position of the transparent area in a moving direction of the signal beam.

2. The method for adjusting the position and aperture of a pinhole according to claim 1, wherein the step of determining the projection position of the signal beam on the liquid-crystal switch comprises scanning the liquid-crystal switch to locate a pixel position corresponding to the projection position of the signal beam.

3. The method for adjusting the position and aperture of a pinhole according to claim 1, wherein the step of determining the projection position of the signal beam on the liquid-crystal switch comprises capturing an optical image signal formed by the signal beam and determining the projection position of the signal beam according to an image forming position of the optical image signal.

4. An optical apparatus for adjusting the position and aperture of a pinhole, comprising:
   a light source for generating a light beam;
   an imaging unit for focusing the light beam on an object and reacting with the object to form a signal beam;
   a liquid-crystal switch located in a moving direction of the signal beam for the signal beam to be projected on the liquid-crystal switch;
   a processing unit for determining the projection position of the signal beam on the liquid-crystal switch and adjusting the transparence of the liquid-crystal switch at the projection position to form a transparent area;
   a light detecting unit for receiving the signal beam passing through the transparent area to form a detecting signal, wherein the processing unit is coupled to the light detecting unit and adjusts the aperture of the transparent area according to the detecting signal; and
   an actuator coupled to the liquid-crystal switch, wherein the actuator drives the liquid-crystal switch to move, so that the position of the transparent area in the moving direction of the signal beam is adjusted.

5. The optical apparatus according to claim 4, wherein the imaging unit comprises:
   a first beam divider for receiving the light beam generated by the light source;
   a first focusing element for focusing the light beam passing through the first beam divider and enabling the focused light beam to reach the object; and
   a second focusing element for focusing the signal beam sequentially passing through the first focusing element and the first beam divider and enabling the focused signal beam to be projected on the liquid-crystal switch.

6. The optical apparatus according to claim 4, wherein the processing unit emits a scanning signal to the liquid-crystal switch to locate a pixel position corresponding to the projection position of the signal beam so as to determine the projection position of the signal beam on the liquid-crystal switch.

7. The optical apparatus according to claim 4, further comprising an image capturing unit coupled to the processing unit, wherein the image capturing unit comprises:
   a second beam divider for receiving the signal beam;
   a third focusing element; and
   an image sensor, wherein the third focusing element is for focusing a reflective beam reflected by the second beam divider and enabling the focused reflective beam to reach the image sensor to form an optical image signal.

8. The optical apparatus according to claim 7, wherein the processing unit determines the projection position of the signal beam according to an image forming position of the optical image signal.

9. The optical apparatus according to claim 7, wherein the second beam divider is movable.

10. The optical apparatus according to claim 9, further comprising a mobile device coupled to the second beam divider.

* * * * *